United States Patent
Jo et al.

(10) Patent No.: US 9,787,754 B2
(45) Date of Patent: Oct. 10, 2017

(54) METHOD FOR PROVIDING SERVICE TO CLIENT USING BROWSER OF VIRTUAL SERVER AND VIRTUAL SERVER AND COMPUTER-READABLE RECORDING MEDIUM USING THE SAME

(71) Applicant: Obigo Inc., Gyeonggi-do (KR)

(72) Inventors: Ki Hyun Jo, Seoul (KR); Jae Cheol Ko, Gyeonggi-do (KR)

(73) Assignee: Obigo Inc., Gyeonggi-do (KR)

( * ) Notice: Subject to any disclaimer, the term of this patent is extended or adjusted under 35 U.S.C. 154(b) by 131 days.

(21) Appl. No.: 14/705,124

(22) Filed: May 6, 2015

(65) Prior Publication Data
US 2016/0286004 A1    Sep. 29, 2016

(30) Foreign Application Priority Data

Mar. 25, 2015  (KR) .................. 10-2015-0041820

(51) Int. Cl.
*G06F 15/16*     (2006.01)
*H04L 29/08*     (2006.01)
*G06F 17/30*     (2006.01)

(52) U.S. Cl.
CPC ........ *H04L 67/02* (2013.01); *G06F 17/30905* (2013.01)

(58) Field of Classification Search
CPC ...................................................... H04L 67/02
See application file for complete search history.

(56) References Cited

U.S. PATENT DOCUMENTS

| | | | | |
|---|---|---|---|---|
| 7,457,878 B1* | 11/2008 | Mathiske | ................ | H04W 4/02 709/227 |
| 8,112,717 B1* | 2/2012 | Akella | .................. | G06F 9/4443 715/788 |
| 2010/0005395 A1* | 1/2010 | Shirakawa | ............ | G06F 9/4445 715/740 |
| 2010/0036814 A1* | 2/2010 | Kalasapur | ........... | G06F 17/3089 707/708 |
| 2010/0199196 A1* | 8/2010 | Thompson | .......... | H04L 67/2828 715/760 |
| 2010/0299325 A1* | 11/2010 | Tzvi | ..................... | G06F 17/2247 707/728 |
| 2015/0046789 A1* | 2/2015 | Wei | ....................... | G06F 9/4445 715/234 |

FOREIGN PATENT DOCUMENTS

| | | |
|---|---|---|
| KR | 10-2002-0048229 A | 6/2002 |
| KR | 10-0935009 B1 | 1/2010 |
| KR | 10-2014-0060683 A | 5/2014 |

* cited by examiner

*Primary Examiner* — Viet Vu
(74) *Attorney, Agent, or Firm* — Husch Blackwell LLP (57) ABSTRACT

A method provides a service to a client by using a browser of a virtual server. The method includes steps of: (a) the virtual server creating a specific tab of a browser corresponding to a specified client, when the virtual server detects that the specified client accesses the virtual server; and (b) the virtual server acquiring a webpage screen from an address designated by the virtual server or a webpage screen requested by a user of the specified client, loading the webpage screen through the specific tab, encoding the webpage screen as a video or a still image, transmitting the encoded webpage screen to the specified client, and allowing the specified client to decode the encoded webpage screen to thereby display it through a screen of the specified client.

16 Claims, 6 Drawing Sheets

METHOD FOR PROVIDING SERVICE TO CLIENT USING BROWSER OF VIRTUAL SERVER AND VIRTUAL SERVER AND COMPUTER-READABLE RECORDING MEDIUM USING THE SAME

CROSS REFERENCE TO RELATED APPLICATION

This application claims priority to and incorporates herein by reference all disclosure in Korean Patent Application No. 10-2015-0041820 filed Mar. 25, 2015.

FIELD OF THE INVENTION

The present invention relates to a method for providing a service to a client using a browser provided on a virtual server and the virtual server and a computer-readable recording medium using the same; and more particularly, to the method, the virtual server and the computer-readable recording medium for providing for the client a webpage screen acquired by creating and allocating a virtualized browser by the client which has accessed a cloud virtual server, monitoring a content server the client is accessing, and providing a variety of mashup services to the client.

BACKGROUND OF THE INVENTION

According to existing internet-based services for providing contents, it was common that, data of contents stored in a server are brought with a browser in a web method or with an exclusive client program in a private protocol method to thereby make a client use the contents of the server.

Herein, as an ability of the internet browser or the exclusive client program to acquire data and run the acquired data largely depends on performance of the client, the performance of the client had to be improved within a short time to support such high-quality and large-quantity services for providing contents.

However, in such a case, as the time had gone by, there were an increasing number of cases where the existing clients had failed to support newly provided services smoothly and these caused the clients to be replaced earlier.

SUMMARY OF THE INVENTION

It is an object of the present invention to solve all the aforementioned problems.

It is another object of the present invention to create and allocate a virtualized browser by client accessing a virtual server and allow a client to receive only a screen of an application if the virtual server runs the application through the allocated browser.

It is still another object of the present invention to allow the virtual server to create a widget layer and provide the widget layer to the client so that the application can be controlled through the widget layer provided through the screen of the client.

It is still yet another object of the present invention to allow the virtual server to create and provide a variety of mashup services for contents while monitoring a content server relating to the client.

In accordance with one aspect of the present invention, there is provided a method for providing a service to a client by using a browser of a virtual server, including steps of: (a) the virtual server creating a specific tab of a browser corresponding to a specified client, when the virtual server detects that the specified client accesses the virtual server; and (b) the virtual server acquiring a webpage screen from an address designated by the virtual server or a webpage screen requested by a user of the specified client, loading the webpage screen through the specific tab, encoding the webpage screen as a video or a still image, transmitting the encoded webpage screen to the specified client, and allowing the specified client to decode the encoded webpage screen to thereby display it through a screen of the specified client.

In accordance with another aspect of the present invention, there is provided a virtual server for providing a service to a client by using a browser thereof, including: a browser creating part for creating a specific tab of a browser corresponding to a specified client, when the virtual server detects that the specified client accesses the virtual server; and a webpage providing part for acquiring a webpage screen from an address designated by the virtual server or a webpage screen requested by a user of the specified client, loading the webpage screen through the specific tab, encoding the webpage screen as a video or a still image, transmitting the encoded webpage screen to the specified client, and allowing the specified client to decode the encoded webpage screen to thereby display it through a screen of the specified client.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
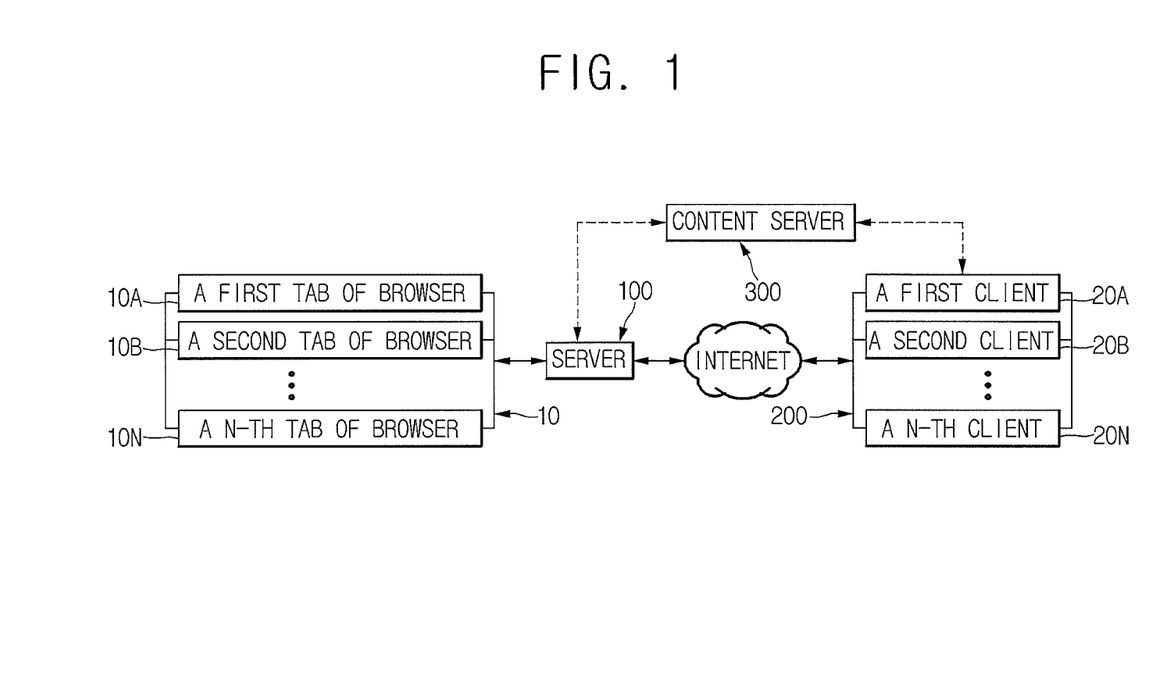
FIG. 1 is a whole configuration of a system for providing a service to a client by using a browser of a virtual server in accordance with the present invention.

To allow those skilled in the art to the present invention to be carried out easily, the example embodiments of the present invention by referring to attached diagrams will be explained in detail as follows:

FIG. 1 illustrates a whole configuration of a system for providing a service to a client by using a browser created by a virtual server in accordance with the present invention.

By referring to FIG. 1, the system of the present invention includes a virtual server 100, a client 200 capable of receiving a state of an application by accessing the virtual server 100, and a content server 300 which retains contents provided to the client 200.

In accordance with the present invention, the client 200 is a thin client, only with necessary hardware devices such as CPU and memory, designed to make all works be managed by the virtual server connected thereto through a network. Herein, examples of the client 200 may include not only a set-top box and a tablet PC but also a variety of user terminals such as a vehicle AVN (i.e., audio visual navigation) and home electronics.

Therefore, it is desirable that the client 200 includes at least a function of sending and receiving data with the virtual server 100 even though it is a low-specification terminal.

In particular, the client 200 may display a webpage provided by the virtual server 100 by connecting to the virtual server 100. More specifically, if the client 200 accesses the virtual server 100, the virtual server 100 may create a new tab of a browser, load a webpage through the new tab of the browser, encode the loaded webpage as a video or a still image, and transmit the video or the still image to the client 200. Then, the client 200 may decode the video or the still image received from the virtual server 100 and then display it through the screen thereof. Besides, a user control for the decoded video or the decoded still image may be inputted through a widget layer provided from the virtual server 100 and displayed through a screen of the client 200.

As shown in FIG. 1, the client 200 may include a first client 20A, a second client 20B, . . . , an n-th client 20N, etc. and the respective clients 200 may access the virtual server 100 through the Internet.

Therefore, the virtual server 100 creates a first tab 10A, a second tab 10B, . . . , an n-th tab 10N of the browser for the first client 20A, the second client 20B, . . . , the n-th client 20N respectively. Then, the virtual server 100 may provide respective webpage screens loaded through the respective tabs to the respective client 200. Herein, the virtual server 100 may encode the respective loaded webpage screens and then transmit the respective encoded webpage screens to the respective client 200.

At the time, it is assumed that the virtual server 100 of the present invention is a cloud server which provides a virtual environment and a browser created by the virtual server 100 is also a virtualized browser, but it is not limited thereto.

Figure 2:
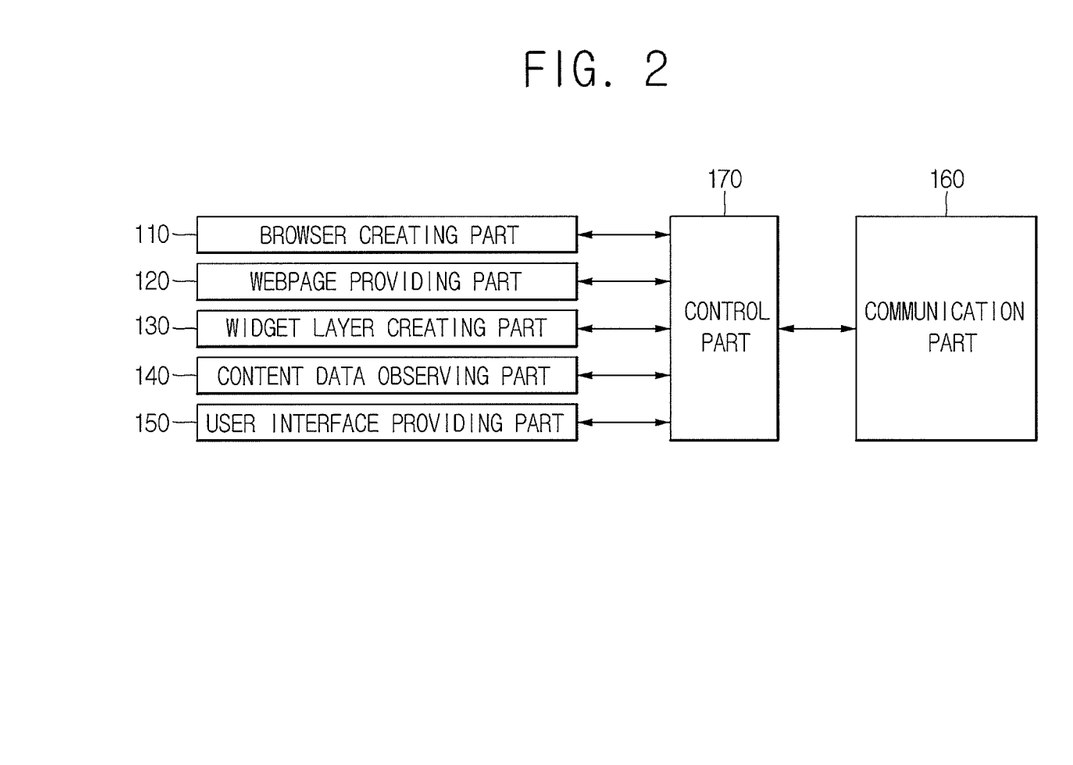
FIG. 2 is a detailed configuration of the virtual server in FIG. 1.

FIG. 2 is an internal configuration of a virtual server 100 in accordance with one example embodiment of the present invention.

As shown in FIG. 2, the virtual server 100 may include a browser creating part 110, a webpage providing part 120, a widget layer creating part 130, a content data observing part 140, a user interface providing part 150, a communication part 160, and a control part 170.

In accordance with an example embodiment of the present invention, at least some of the browser creating part 110, the webpage providing part 120, the widget layer creating part 130, the content data observing part 140, the user interface providing part 150, the communication part 160, and the control part 170 may be program modules communicating with the virtual server 100.

Such program modules may be included in the virtual server 100 in a form of an operating system, an application program module and other program modules or physically stored in various storage devices well known to those skilled in the art. In addition, they may be stored in a remote storage device capable of communicating with the virtual server 100. The program modules may include but not be subject to a routine, a subroutine, a program, an object, a component, and a data structure for executing a specific operation or a type of specific abstract data that will be described in accordance with the present invention.

If the virtual server 100 detects the access of a specified client 200, the browser creating part 110 may create a specific tab of a browser corresponding to the specified client 200.

In other words, the browser creating part 110 creates the first tab 10A if the first client 20A accesses the virtual server 100; and the second tab 10B if the second client 20B accesses the virtual server 100; and the n-th tab 10N of the browser if the n-th client 20N accesses the virtual server 100.

Figure 3:
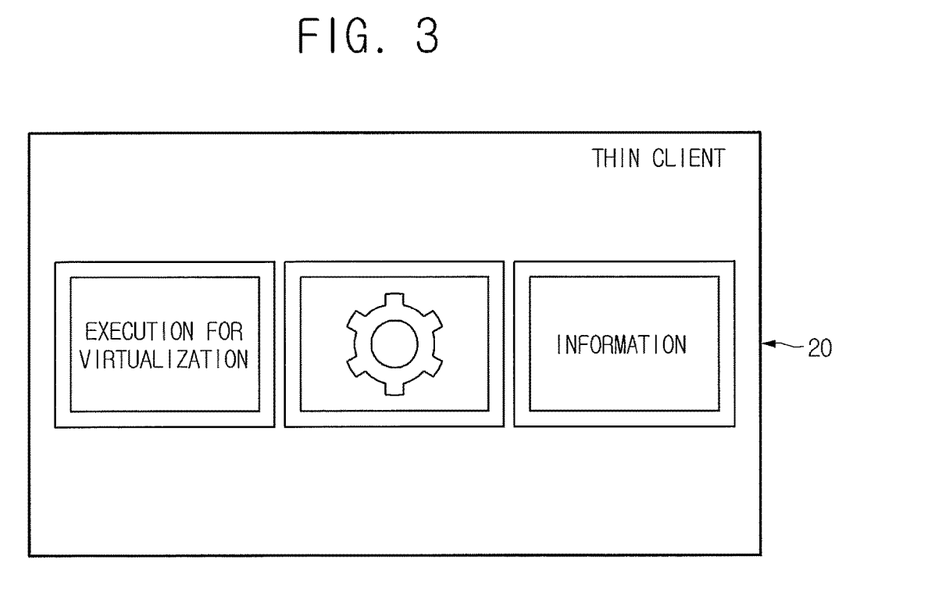
FIG. 3 shows an example of a default UI screen for allowing a user of the client of FIG. 1 to access the virtual server.

For reference, ahead of this, to make the client 200 easily connect to the virtual server 100, as shown in an exemplary screen of FIG. 3, the user interface providing part 150 may provide a default UI screen 20 to the client 200. In other words, if the client 200 operates, a UI screen for allowing a user of the client 200 to access the virtual server 100 may be provided from the virtual server 100. If a button provided through the UI screen 20 for the connection establishment is selected, the virtual server 100 receives a request for connection from the client 200 and the browser creating part 110 of the virtual server 100 creates a specific tab of the browser if the client 200 is determined to be qualified.

Thereafter, the webpage providing part 120 of the virtual server 100 encodes a webpage screen loaded through the specific tab of the browser as a screen of video or still image and transmits it to the specified client 200 to allow the specified client 200 to decode it and then display it thorough the screen of the specified client 200.

Figure 4A:
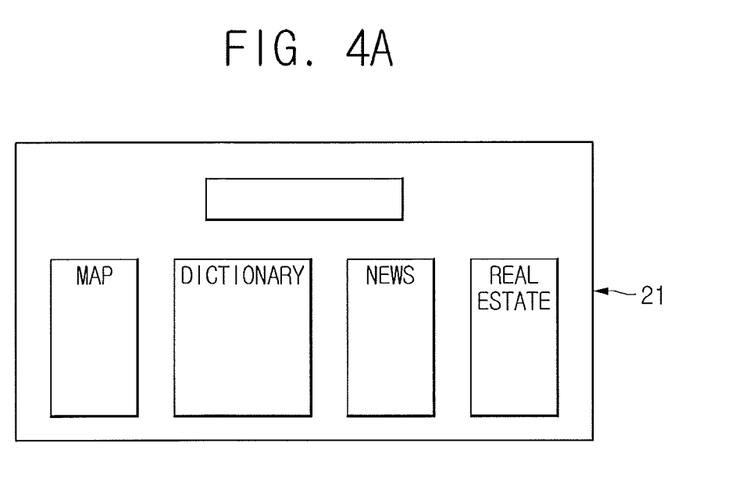
FIG. 4A illustrates a webpage screenshot displayed through a screen of the client.

As shown in FIG. 4A, a webpage screen 21 loaded through the specific tab by the webpage providing part 120 may be acquired from an address designated by the virtual server 100 or requested by the client 200.

Figure 4B:
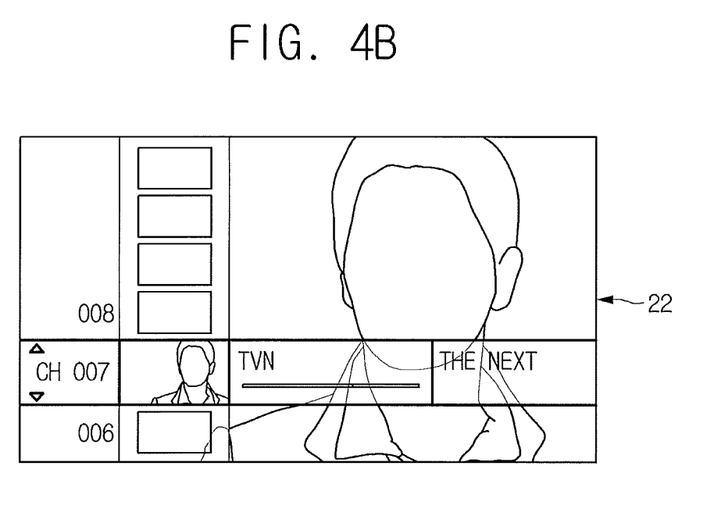
FIG. 4B illustrates another screenshot displayed through a screen of the client.

Besides, the webpage providing part 120 may run a web application corresponding to the specific tab of the browser and deliver the screen of the web application to the specified client 200. At the time, as shown in FIG. 4B, a screenshot of the web application may be provided to the client 200 as an initial screen for the client 200.

Accordingly, the virtual server 100 run on a single operating system may allocate only the respective tabs of the browser to each of the clients 200 to make the respective tabs of the browser provide the states of respective web applications and encode the states of respective web applications in real time as video or still image and then provide the encoded states, i.e., the encoded webpages acquired by the web applications, to the clients 200. Therefore, the respective clients 200 could display the screens of the web applications only by decoding the encoded states without any browser.

In order to allow a user of the specified client 200 to control the decoded webpage through the screen of the specified client 200, the widget layer creating part 130 of the virtual server 100 may make the widget layer be provided to the specified client 200 and then overlappedly displayed on the decoded webpage through the screen of the specified client 200.

In other words, the widget layer creating part 130 creates the widget layer and provides (e.g., overlays) it on a video stream or a still image displayed through the screen of the specified client 200. On an exemplary screen as shown in FIG. 5, user-controllable widgets 2A, 2B, 2C, 2D, and 2E such as button, list, and pop-up are displayed and allow an event, if the user takes an action such as clicking or scrolling the corresponding widget, to be delivered to the virtual server 100.

To this end, respective widgets included in the widget layer may be managed by widget IDs, coordinate values which inform the location and the size of the widgets, and metadata including information on controlling the widgets by a user. The respective widgets are delivered to the client 200 in a format of, e.g., xml or JSON.

Figure 5:
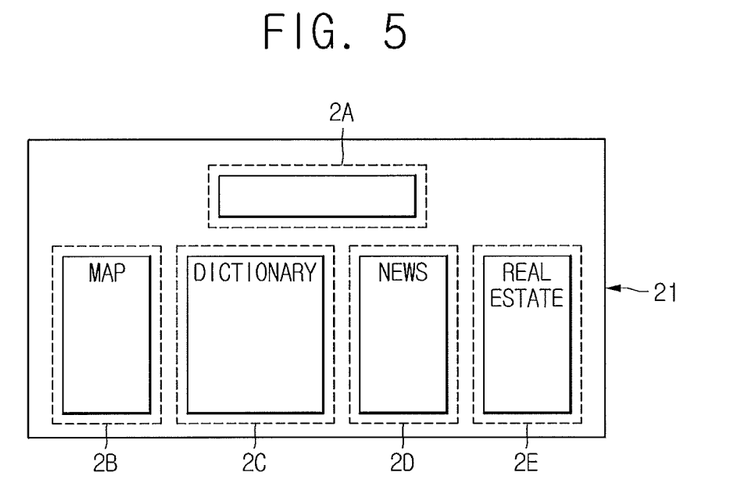
FIG. 5 provides an example of a widget layer displayed through a screen of the client.

In detail, as shown in FIG. 5, when the user takes a particular action such as touching or scrolling a screen area corresponding to a certain widget, the client 200 creates data on which ID the certain widget has and which actions have been taken for the certain widget and then delivers the data to the virtual server 100. Then, the virtual server 100 controls a webpage or an application loaded through the browser tab by referring to the delivered data.

Accordingly, whenever an event by the user action for the certain widget included in the widget layer is delivered to the virtual server 100, a course of the virtual server 100 encoding a screen acquired by a browser tab (corresponding to the event) as a video or a still image, transmitting it to the specified client 200, and then allowing the specified client 200 to decode it is repeated.

Finally, the client 200 receives only a result screen controlled by a control signal of the virtual server 100, but an interface environment as if the result screen were controlled by the client 200 would be provided.

The specified client 200 may receive a variety of content services directly or indirectly from the content server 300 through the web application. In detail, the content data observing part 140 of the virtual server 100 may access the content server 300 corresponding to the content provided to the specified client 200 and identify the content provided from the content server 300 to the specified client 200 and then provide additional data corresponding to the identified content to the specified client 200 after acquiring them.

At the time, in order to monitor the content provided to the specified client 200, the content data observing part 140 may identify the content currently used at the specified client 200 by accessing the specified client 200 or by accessing the content server 300 directly without going through the client 200.

In addition, it may create and provide the additional data required for the user of the client 200 through the monitoring process.

On assumption that the specified client 200 receives the content directly or indirectly from the content server 300 such as a TV or a radio channel, new additional information and services may be made and provided by referring to information such as program names, air times. Further, the services may also be made and provided by referring to information on location of the specified client 200 and language selected by the specified client 200, etc.

As a detailed example of the new additional information, when a specific content is on the air through a specified radio or a specified TV channel that the client 200 is receiving, the virtual server 100 may identify the specific content on the air by receiving information on the specific content directly from the client 200 or connecting to a server of the specified radio or the specified TV channel. The, the virtual server 100 may produce a mashup service (e.g., advertising) that may be combined, or correlated, with the specific content and provide the mashup service through an IP-based communication to the client 200.

As another additional information, it may provide information on a songwriter, a singer, a relevant event or an advertising with respect to a song.

In general, the mashup service of the content server is made in a client or is configured in a server based on the information provided by the client, but in the present invention, more various and more accurate mashup services could be produced because the information provided by the client 200 as well as the specific content used by the client 200 can be monitored by the virtual server 100.

Again, given the configuration of the virtual server 100 in FIG. 2, the communication part 160 in the present invention may perform a function of allowing communication from/to the browser creating part 110, the webpage providing part 120, the widget layer creating part 130, the content data observing part 140, the user interface providing part 150, and the control part 170 or external devices.

Finally, the control part 170 in accordance with one example embodiment of the present invention may perform a function of controlling data flow among the browser creating part 110, the webpage providing part 120, the widget layer creating part 130, the content data observing part 140, the user interface providing part 150, and the communication part 160. In other words, the control part 170 in the present invention may control the flow of data from/to outside or among the components of the virtual server 100 and thereby allow the browser creating part 110, the webpage providing part 120, the widget layer creating part 130, the content data observing part 140, the user interface providing part 150, and the communication part 160 to perform their unique functions.

In accordance with the present invention, functions of the client are partially granted to the virtual server by using cloud server technology so that the client can be produced with a simple structure without having unnecessary functions.

Besides, the price of the terminal could be much lower by designing a simple type of the client in consideration of a cloud server and it could be easier to provide software which performs the function of the client not only to a client exclusive for a specific server as well as a variety of terminals.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing a service to a thin client by using a browser of a virtual server, comprising steps of:
   (a) the virtual server creating a specific tab of a browser corresponding to a specified thin client, when the virtual server detects that the specified thin client accesses the virtual server; and
   (b) the virtual server acquiring from a web server a webpage from an address designated by the virtual server or a webpage requested by a user of the specified thin client;
   (c) the virtual server loading the webpage through the specific tab;
   (d) the virtual server encoding the webpage as a video or a still image; and
   (e) the virtual server transmitting the still image or video of the webpage instead of the webpage itself to the specified thin client, and allowing the specified client to decode the still image or video of the webpage to thereby display the still image or video of the webpage through a screen of the specified thin client;
   (f) the virtual server generating a widget layer, including at least one user-controllable widget, to be overlaid on the still image or video of the webpage displayed on the screen of the specified thin client,
   (g) the virtual server receiving, from the thin client, information regarding an event generated by a user interaction with at least one of said at least one user-controllable widget, and communicating with the web server to control the webpage based on the user interaction with the at least one of said at least one user-controllable widget.

2. The method of claim 1, wherein the widget layer includes at least one of the widget ID, coordinate values informing a location and a size of the widget on the screen, and metadata containing control information by the user's action.

3. The method of claim 1, further comprising the step of: the virtual server encoding a result screen corresponding to an event generated by a user action with respect to a certain widget included in the widget layer, if being delivered, as a video or a still image, transmitting the encoded result screen to the specified thin client, and allowing the specified thin client to decode the encoded result screen to thereby display it through the screen of the specified thin client.

4. The method of claim 1, wherein, at the step of (b), a web application corresponding to the specific tab of the browser is run and delivered to the specified thin client.

5. The method of claim 1, before the step of (a), comprising the step of: (a0) the virtual server providing a default UI screen for allowing a user of the specified thin client to access the virtual server.

6. The method of claim 1, wherein, if the virtual server detects the access of the specified thin client at the step of (a), the still image or video of the webpage designated by the virtual server includes an initial webpage screen and the virtual server allows the initial webpage screen to be transmitted to, and displayed through the screen of the specified thin client.

7. The method of claim 1, wherein the virtual server checks a content provided to the specified thin client, acquires additional data corresponding to the content, and then provides the additional data to the specified thin client.

8. A virtual server for providing a service to a thin client by using a browser thereof, comprising:
   a browser creating part for creating a specific tab of a browser corresponding to a specified thin client, when the virtual server detects that the specified thin client accesses the virtual server; and
   a webpage providing part for:
      acquiring, from a web server, a webpage from an address designated by the virtual server or a webpage requested by a user of the specified thin client;
      loading the webpage through the specific tab;
      encoding the webpage as a video or a still image;
      transmitting the still image or video of the webpage instead of the webpage itself to the specified thin client, and allowing the specified thin client to decode the still image or video of the webpage to thereby display the still image or video of the webpage through a screen of the specified thin client
      generating a widget layer, including at least one user-controllable widget, and overlaying the widget layer on the still image or video of the webpage displayed on the screen of the specified thin client; and
      receiving, from the thin client, information regarding an event generated by a user interaction with at least one of said at least one user-controllable widget, and communicating with the web server to control the webpage based on the user interaction with the at least one of said at least one user-controllable widget.

9. The virtual server of claim 8, further comprising: a widget layer creating part for allowing a widget layer, including a user-controllable widget, to be provided on the screen of the specified thin client while the still image or video of the webpage is displayed through the screen of the specified thin client.

10. The virtual server of claim 9, wherein the widget layer includes at least one of the widget ID, coordinate values informing a location and a size of the widget on the screen, and metadata containing control information by the user's action.

11. The virtual server of claim 9, wherein the webpage providing part encodes a result screen corresponding to an event generated by a user action with respect to a certain widget included in the widget layer, if being delivered, as a video or a still image, transmits the encoded result screen to the specified thin client, and allows the specified thin client to decode the encoded result screen to thereby display it through the screen of the specified thin client.

12. The virtual server of claim 8, wherein the webpage providing part runs a web application corresponding to the specific tab of the browser and allows the web application to be delivered to the specified thin client.

13. The virtual server of claim 8, further comprising: a user interface providing part for providing a default UI screen for allowing a user of the specified thin client to access the virtual server.

14. The virtual server of claim 8, wherein, if the browser creating part detects the access of the specified thin client, the still image or video of the webpage designated by the virtual server includes an initial webpage screen and the webpage providing part allows the initial webpage screen to be transmitted to, and displayed through the screen of the specified thin client.

15. The virtual server of claim 8, further comprising: a content data observing part for checking a content provided to the specified thin client, acquiring additional data corresponding to the content, and then providing the additional data to the specified thin client.

16. One or more non-transitory computer-readable recording media having stored thereon a computer program that, when executed by one or more processors, causes the one or more processors to perform acts including:

(a) a virtual server creating a specific tab of a browser corresponding to a specified thin client, when the virtual server detects that the specified thin client accesses the virtual server; and (b) the virtual server acquiring from a web server a webpage from an address designated by the virtual server or a webpage requested by a user of the specified thin client;

(c) the virtual server loading the webpage through the specific tab;

(d) the virtual server encoding the webpage as a video or a still image; and (e) the virtual server transmitting the still image or video of the webpage instead of the webpage itself to the specified thin client, and allowing the specified thin client to decode the still image or video of the webpage to thereby display the still image or video of the webpage through a screen of the specified thin client;

(f) the virtual server generating a widget layer, including at least one user-controllable widget, to be overlaid on the still image or video of the webpage displayed on the screen of the specified thin client, (g) the virtual server receiving, from the thin client, information regarding an event generated by a user interaction with at least one of said at least one user-controllable widget, and communicating with the web server to control the webpage based on the user interaction with the at least one of said at least one user-controllable widget.

* * * * *